United States Patent
Birk et al.

(10) Patent No.: US 11,577,231 B2
(45) Date of Patent: Feb. 14, 2023

(54) ENHANCED REDUCTION BIOREMEDIATION METHOD USING IN-SITU ALCOHOLYSIS

(71) Applicant: Tersus Environmental LLC, Wake Forest, NC (US)

(72) Inventors: Gary M. Birk, Wake Forest, NC (US); David F. Alden, Scranton, PA (US)

(73) Assignee: Tersus Environmental LLC

( * ) Notice: Subject to any disclaimer, the term of this patent is extended or adjusted under 35 U.S.C. 154(b) by 307 days.

(21) Appl. No.: 16/797,617

(22) Filed: Feb. 21, 2020

(65) Prior Publication Data
US 2021/0260566 A1 Aug. 26, 2021

(51) Int. Cl.
| | | |
|---|---|---|
| B09C 1/08 | (2006.01) | |
| B01J 31/00 | (2006.01) | |
| B01J 23/04 | (2006.01) | |
| B01J 35/00 | (2006.01) | |
| B01J 37/04 | (2006.01) | |
| B09C 1/00 | (2006.01) | |
| C02F 1/72 | (2023.01) | |
| C02F 3/28 | (2023.01) | |
| C02F 3/34 | (2023.01) | |
| C02F 103/06 | (2006.01) | |

(52) U.S. Cl.
CPC ............. *B01J 31/003* (2013.01); *B01J 23/04* (2013.01); *B01J 35/0013* (2013.01); *B01J 37/04* (2013.01); *B09C 1/002* (2013.01); *B09C 1/08* (2013.01); *C02F 1/725* (2013.01); *C02F 3/28* (2013.01); *C02F 3/342* (2013.01); *B01J 2231/005* (2013.01); *B01J 2531/002* (2013.01); *B09C 2101/00* (2013.01); *C02F 2103/06* (2013.01)

(58) Field of Classification Search
None
See application file for complete search history.

(56) References Cited

U.S. PATENT DOCUMENTS

| | | | | |
|---|---|---|---|---|
| 3,655,569 A | * | 4/1972 | Hellsten ................... | C11D 3/39 510/222 |
| 2009/0023820 A1 | * | 1/2009 | Dailey ................... | D06M 13/17 516/204 |
| 2014/0121137 A1 | * | 5/2014 | Andrecola ............. | C09K 8/524 507/244 |
| 2015/0068755 A1 | * | 3/2015 | Hill ......................... | C09K 8/92 166/305.1 |
| 2015/0360982 A1 | | 12/2015 | Archibald | |
| 2017/0218255 A1 | * | 8/2017 | Poltronieri ............. | C09K 8/524 |

FOREIGN PATENT DOCUMENTS

| | | | |
|---|---|---|---|
| CN | 1071449 | * | 4/1993 |
| WO | 2011078949 | * | 6/2011 |

OTHER PUBLICATIONS

Office of Science. "DOE Explains . . . Catalysts". 2022 (Year: 2022).*
Sawyer et al., Chemistry for Environmental Engineering. McGraw-Hill Inc; 1994, Chapter 4: pp. 114-211, Chapter 5: pp. 212-313, and Chapter 6: pp. 315-359.
Maymo-Gatell et al.; Isolation of a Bacterium That Reductively Dechlorinates Tetrachloroethene to Ethene; Science (1997) 276:1568-1571.
Ma et al; Biodiesel Production: A Review; Bioresour. Technol., 70 (1999), pp. 1-15.
Wei et al; Electron Acceptor Interactions Between Organohalide-Respiring Bacteria: Cross-Feeding, Competition, and Inhibition; Department of Chemical Engineering and Applied Chemistry, University of Toronto, Toronto, ON, Canada, 2016.
Yusuf et al., Overview on the Current Trends in Biodiesel Production; Energy Convers. Manage., 52 (2011), pp. 2741-2751.
ESTCP Technical Report: White Paper, A Review of Biofouling Controls for Enhanced In Situ Bioremediation of Groundwater; Oct. 2005, pp. 1-55.
Chawla et al; Effect of Alcohol Cosolvents on the Aqueous Solubility of Trichloroethylene, Proceedings of the 2001 Conference on Environmental Research, pp. 52-66.
Abbah et al; American Journal of Energy Science (AJER). 3 (2016), pp. 16-20.
Istiningrum et al. 2017 AIP Conference Proceedings 1911, 020031 (2017); https://doi.org/10.1063/1.5016024, pp. 1-6.
Environmental Security Technology Certification Program, Protocol for Enhanced In Situ Bioremediation Using Emulsified Edible Oil; Arlington, VA, May 2006, pp. 1-99.
European Search Report EP 21155349 dated Jul. 13, 2021.

* cited by examiner

*Primary Examiner* — Sheng H Davis
(74) *Attorney, Agent, or Firm* — Belles Katz LLC (57) ABSTRACT

The present subject matter relates to a composition for in-situ remediation of soil and aquifer comprising of a water miscible oil; a solvent (for dissolving the vegetable oil to form a solution); and a catalyst (selected from enzymes biocatalysts, particularly lipases, alkaline compounds, heat or combinations thereof). The present subject matter provides a process for the preparation of the composition and application of the same for surface remediation. Further, the present subject matter provides an in-situ alcoholysis remediation method to reduce contaminant concentrations in aquifer and soil by enabling the generation of both soluble and slowly fermenting electron donors required for the anaerobic remediation of organohalide compounds contaminating soils and groundwater. The method of remediation includes mixing an engineered water-soluble oil or water miscible oil with a solvent and adding a catalyst to groundwater to promote the formation of fatty acid alkyl esters, carboxylic acid salts and glycerol.

20 Claims, 9 Drawing Sheets

ENHANCED REDUCTION BIOREMEDIATION METHOD USING IN-SITU ALCOHOLYSIS

TECHNICAL FIELD

The present subject matter relates to bioremediation methods and in particular to in-situ remediation of soil and aquifer.

BACKGROUND

One of the leading environmental issue is groundwater contamination. Groundwater contamination results from the accidental, unknowing or clandestine release of chemicals that infiltrate into the subsurface. Chlorinated solvents are the most common class of chemicals creating contaminated groundwater sites, for-example, in the United States. Perchlorate; explosives such as nitroaromatics, nitramines, nitrate esters, and energetic munitions residuals; nitrates; oxidized metals; and other contaminants also appear on lists of contaminants frequently detected at hazardous waste sites. Once in the environment, these contaminants present an environmental situation that must be managed to comply with regulations, protect human health and the environment and potentially restore productive use to hazardous sites.

Remediation of groundwater contaminated by these compounds presents unique challenges. Recent advances in anaerobic biodegradation processes allow remediation of difficult conditions including saturated or variably saturated soils, contaminant source zones (i.e., by dense non-aqueous phase liquid or DNAPL) and low-permeability soils (i.e., contaminated clays) at a much lower-cost than conventional methods such as pump-and-treat, in-situ chemical oxidation or excavation.

Figure 1:
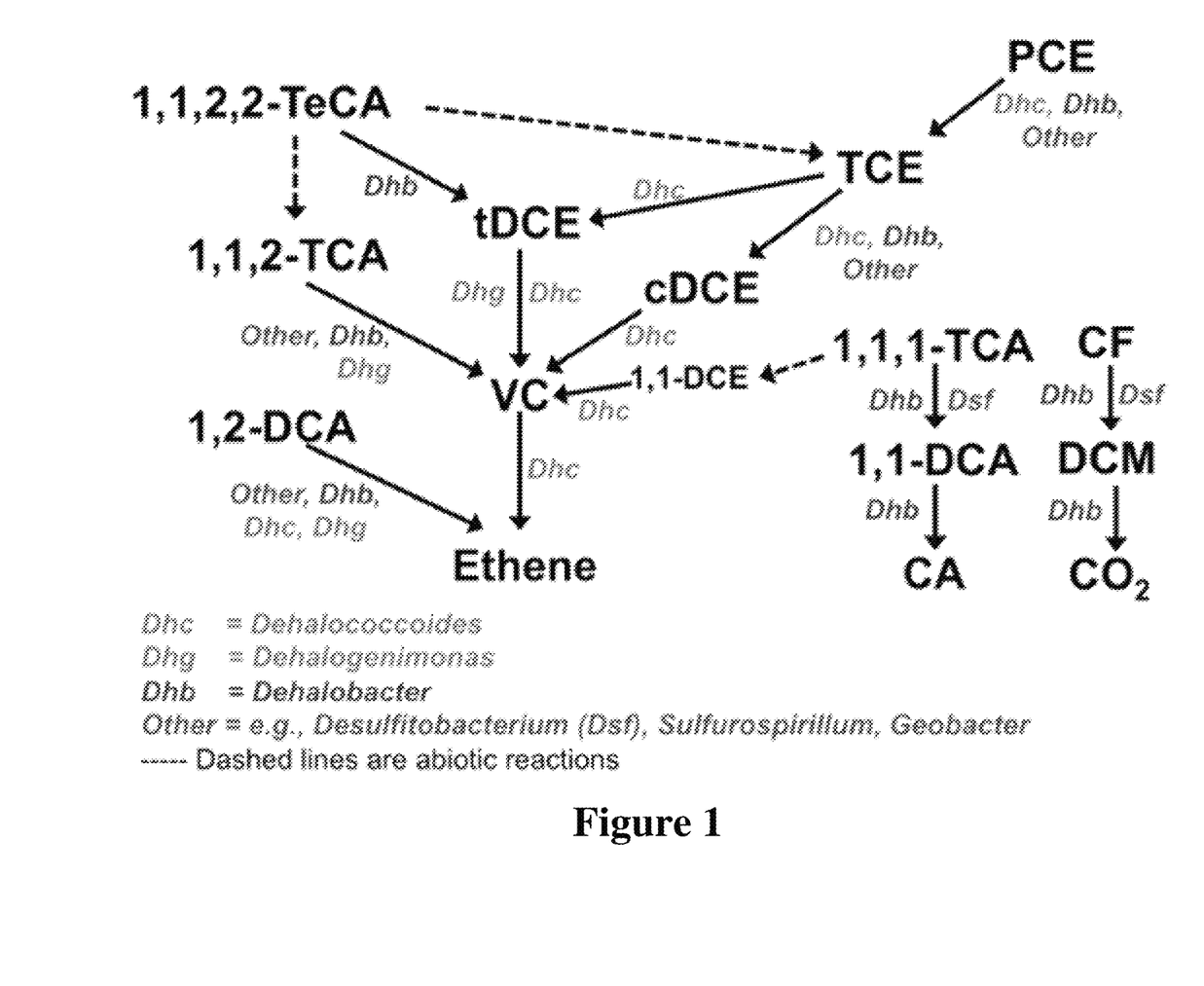
FIG. 1 illustrates a state of the art showing common chlorinated solvent dechlorination pathways and organisms responsible therein. (Wei et al; *Electron Acceptor Interactions Between Organohalide-Respiring Bacteria: Cross-Feeding, Competition, and Inhibition*, 2016)

Chlorinated solvents are generally biodegradable under certain anaerobic conditions. Anaerobic reducing conditions can be created by the addition of organic substrate to the aquifer. This organic material provides carbon and electrons that microorganisms use initially to consume oxygen or other occurring electron acceptors such as nitrate ($NO_3$), iron ($Fe^{+2}$), sulfate ($SO_4^{2-}$) and chlorinated solvents. When highly reducing conditions are established, many contaminants relatively rapidly degrade to non-regulated compounds. An overview of common chlorinated solvent dechlorination pathways and organisms responsible is provided in FIG. 1.

Interest has also grown towards using slow release electron donors in enhanced bioremediation (also referred to as biostimulation) systems for treating contaminants in groundwater. Emulsified vegetable oil (EVO) has been used as a carbon source to stimulate organohalide-respiring bacteria that mineralize chlorinated solvents. Regardless of the electron donor (substrate), enhanced anaerobic bioremediation is a two-step process. In the first step, the added substrate is fermented by the indigenous microbial population to generate hydrogen and fatty acids. In step two, a more specialized population of microbes known as organohalide-respiring bacteria use hydrogen as the sole electron donor during dehalorespiration, a process that effectively replace the halogen (i.e., chlorine atoms in solvent molecules) with a hydrogen ion. This process is thus also referred to as reductive dechlorination. Under appropriate conditions, the parent compounds can be completely dechlorinated to innocuous end products such as ethene, ethane and methane.

Vegetable fats (triglycerides) can anaerobically ferment to hydrogen and low-molecular weight fatty acids by common subsurface microorganisms. Under anaerobic fermentation, a two-step process occurs where the ester linkages between the glycerol and the fatty acids are hydrolyzed releasing free fatty acids and glycerol to solution. The released glycerol degrades to 1,3-propanediol and subsequently to acetate. The saturated fatty acids further breakdown by beta-oxidation resulting in the formation of two molecules of hydrogen ($H_2$), and one molecule of acetate ($C_2H_3O^{2-}$). The original molecule of acid appears as a new acid derivative with two less carbon atoms (Sawyer et al., *Chemistry for Environmental Engineering*. McGraw-Hill Inc; 1994).

$$C_nH_{2n}O_2 + 2H_2O \rightarrow 2H_2 + C_2H_3O^{2-} + H^+ + C_{n-2}H_{2n-4}O_2$$

As per Sawyer et al, by successive oxidation at the beta carbon atom, long-chain fatty acids are whittled into progressively shorter fatty acids and acetic acid and subsequently four hydrogen atoms are released from saturated fatty acids for each acetic acid unit produced. Unsaturated fatty acids undergo the same general process but release two atoms of hydrogen for each acetic acid unit (*Environmental Security Technology Certification Program*, Arlington, Va., 2006).

Vegetable oils are hydrophobic at a molecular level because they contain a fraction that causes it to repel water. To improve the distribution of vegetable oils in aquifers, some suppliers of electron donors add emulsifiers to the oil, allowing it to disperse with water in the form of micelles. The electron donor is packaged as an oil-in-water emulsion containing 25 to 50% water. Water is thus inherently purchased during EVO sales. The current practice is to provide the substrate as an emulsified vegetable oil (EVO) that contains 25 to 50% water. The substrate is purchased from a supplier and shipped to the contaminated site. Typical dilution ratios range from one-part EVO to four parts water to one-part EVO to 100 parts water. Additional chase water is often added to aid with the distribution of EVO in aquifers. The costs of the electron donor may be a significant fraction of total process costs. Thus, the selection of an efficient and low-cost electron donor is important to the efficacy and overall economics of these systems.

Figure 2:
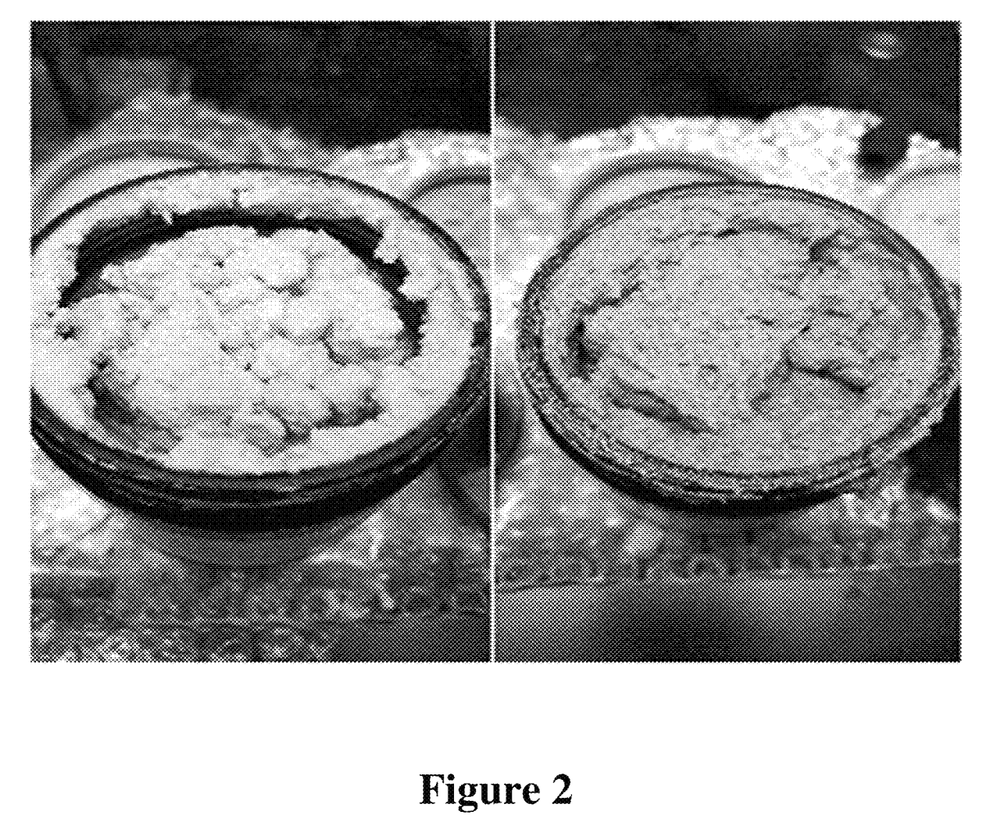
FIG. 2 illustrates biofouling material collected from groundwater monitoring wells after an EVO injection in accordance with the state of the art employed mechanisms.

Biofouling after an EVO injection is a common problem as oil creates high residual saturations that aren't easy to wash-off. Biofouling of the injection wells can occur as hydrophobic oil sorbs to solid materials in the vicinity of the injection point creating a residual film that stimulates biomass growth. It may also result from bacteria using oxygen, nitrate, iron, manganese, or sulfate as electron acceptors coincidentally with degradation of the target contaminants. The addition of EVO as an electron donor promotes a wide range of microbial metabolic activity that can cause biofilm formation and well biofouling (*ESTCP Technical Report: White Paper*, October, 2005). Samples of biofouling material collected from groundwater monitoring wells after an EVO injection is shown in FIG. 2. Avoiding biofouling issues is important during remediation as they can be costly to the project due to impairment of constructed electron-donor injection wells or the reduction in the aquifer's hydraulic permeability which in turn limits groundwater flow or the addition of remediation products.

Biostimulation is a bioremediation method that promotes favorable microbial activity. There are many types of organisms in soils and aquifers and dominance of one microbial process over another is influenced by several factors. These factors include availability, type and concentration of electron acceptors and electron donors, temperature, pH, concentration and nature of chlorinated solvents or other volatile organic compounds, and other potentially inhibitory contaminants or elements. *Dehalococcoides McCartyi*, *Dehalobacter*, and *Dehalogenimonas* are among a genus of strict anaerobic organohalide respiring bacteria that obtain energy via the oxidation of hydrogen and subsequent reductive dehalogenation of chlorinated ethenes (Gatell et al.; *Science* (1997) 276:1568-1571). Biostimulation for chlorinated solvents thus aims to create favorable conditions for these bacteria and generally involves the addition of electron donors.

Bacterial activity is sensitive to pH and the discussed biostimulation efforts should include methods to maintain an optimal pH which is between 6 and 8.5 standard units. Most microbial processes associated with the breakdown of electron donors tend to lower pH by the production of acidic fermentation products such as carbon dioxide and volatile fatty acids. Adding electron donor to groundwater with pH values lower than 6.0 will likely keep or further drop the aquifer's pH as fermentation processes increase acidity. In addition, reductive dechlorination produces hydrochloric acid (HCl).

For example, site with trichloroethylene (TCE) at 1% of aqueous solubility (14,720 µg/L) will generate the following acidity:
Given:
  TCE Formula: $C_2HCl_3$
  TCE Molar Mass: 131.4 g/mol
  14,720 µg/L=0.01472 g/L
  HCl Molar Mass: 36.46 g/mol
TCE Reductive Dechlorination to Ethane:

$$3H_2 + C_2HCl_3 \Rightarrow C_2H_4 + 3HCl$$

One mole of TCE forms three moles of hydrochloric acid. Therefore:

$$\frac{0.01472 \frac{g}{L}}{131.4 \text{ g/mol}} = 1.12 \times 10^{-4} \text{ mol TCE/L}$$

$$1.12 \times 10^{-4} \text{ mol TCE/L} \times 3 \text{ mole } \frac{HCl}{Mol} TCE = 3.36 \times 10^{-4} \text{ mol HCl/L}$$

$$3.36 \times 10^{-4} \text{ mol} \frac{HCl}{L} \times 36.46 \frac{g}{mol} = 0.012 \text{ gHCl/L}$$

Accordingly, the pH control poses a major challenge for the in-situ bioremediation of chlorinated solvents, particularly when aquifers lack enough natural buffering capacity. Although adding electron donor in excess would intuitively minimize intervention costs, the excessive production of acidity is counterproductive. Slowly fermenting products such as EVO better protect a pH drop rather than soluble electron donors. That said, a uniform distribution of EVO is difficult due to high losses to sorption, obligating practitioners to inject EVO in excess and loosing pH and permeability control.

In view of the foregoing, it is necessitated to provide methods for accelerating or effectively enhancing in-situ bioremediation at-least of halogenated straight-chain and aromatic hydrocarbons; perchlorate; explosives such as nitroaromatics, nitramines, nitrate esters, and energetic munitions residuals; nitrates; oxidized metals; and other contaminants in groundwater in order to exhibit a significant advancement over the art.

Objectives of the Subject Matter

At least an objective of the present subject-matter is to provide a method for in-situ remediation of recalcitrant organic and inorganic compounds in groundwater wherein capital costs are lowered using a definite composition of chemical constituents.

Another objective of the present subject-matter is to provide a method to introduce water-soluble oil solvent mixture and a catalyst to the targeted contaminated area so that the fatty acids of the triglyceride molecule are cleaved and attach to the alkyl group (the part made of carbon and hydrogen) of the alcohol to form fatty acid alkyl esters, carboxylic acids/salts and glycerol.

Yet another objective of the present subject-matter is to provide a composition that is consumed by microbes in the groundwater for using the formed products as electron donors for reducing the contaminant into an innocuous derivative thereof.

SUMMARY

This summary introduces a selection of concepts that are further described in the Detailed Description of Some Embodiments section of the present disclosure. This summary is neither intended to identify key or essential inventive concepts of the disclosure, nor is it intended for determining the scope of the subject matter or disclosure.

The present subject matter relates to a composition for in-situ remediation of soil and aquifer. The present subject matter particularly provides a composition comprising of a water miscible oil (consisting of a vegetable oil and a surfactant); a solvent (for dissolving the vegetable oil to form a solution); and a catalyst (selected from enzymes biocatalysts, particularly lipases, alkaline compounds, heat or combinations thereof). The present subject matter further provides a process for the preparation of the composition and a method of application of the same for remediation of soil and aquifer.

In an implementation, the present subject matter improves a composition for in-situ reductive bioremediation wherein the composition provides a water-miscible, slowly-fermenting and aquifer buffering electron donor. The present subject matter further provides a method for remediation of contaminated subsurface soils, water and aquifers. Under anaerobic conditions, organic contaminants can serve as the electron donors or electron acceptors during biodegradation processes. Anaerobic reductive bioremediation involves the method of adding organic substrates or electron donors to groundwater to generate and sustain anoxic conditions.

In accordance with the present subject matter, a bacterial growth may consume organic material via aerobic respiration, oxygen and other electron acceptors. Fermentation reactions thus take place on excess organic material, generating in turn hydrogen that allows anaerobic biological processes that reduce oxidized contaminants such as halogenated compounds to innocuous end products. Halogenated compounds serve as electron acceptors and undergo reductive dehalogenation under anaerobic conditions in the presence of an electron donor.

In an embodiment, the present subject matter at least illustrates a composition for in-situ remediation of soil and aquifer, said composition consisting essentially of:
(a) a water miscible oil consisting of a vegetable oil and a surfactant;
(b) a solvent miscible with water and adapted to dissolve the vegetable oil to form a solution; and
(c) a catalyst selected from the group consisting of an enzyme defined by a biocatalyst, an alkaline compound, heat or combinations thereof.

Another feature of the present subject matter relates to a method for in-situ remediation of recalcitrant organic and inorganic contaminants in soil and an aquifer using the disclosed composition; the method comprising:
(a) mixing a solvent and a water miscible oil to obtain a mixture, wherein the water miscible oil consists of a vegetable oil, and a surfactant or a co-surfactant or a polymer or a blend thereof;
(b) combining a catalyst with the mixture obtained in step (a) to obtain a composition for in-situ use, wherein the catalyst is selected from the group consisting of an enzyme defined at least by a biocatalyst, an alkaline compound, heat or combinations thereof; and
(c) introducing the composition obtained in step (b) into the soil or aquifer.

To further clarify advantages and features of the subject matter claimed herein, example descriptions and embodiments are rendered by reference to specific embodiments thereof, which is illustrated in the appended drawings. It is appreciated that these drawings depict only example embodiments of the subject matter and are therefore not to be considered limiting of its scope. The disclosure will be described and explained with additional specificity and detail with the accompanying drawings.

BRIEF DESCRIPTION OF THE DRAWINGS

The above and other features, aspects, and advantages of the present disclosure will become better understood when the following detailed description is read with reference to the accompanying drawings in which like characters represent like parts throughout the drawings, wherein.

The elements in the drawings are illustrated for simplicity and may not have been necessarily drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION OF SOME EXAMPLE EMBODIMENTS

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated composition, and such further applications of the principles of the present disclosure as illustrated therein being contemplated as would normally occur to one skilled in the art to which the present disclosure relates.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other sub-systems or other elements or other structures or other components or additional sub-systems or additional elements or additional structures or additional components.

Unless otherwise defined, all technical and scientific terms used herein have the same meaning as commonly understood by one of ordinarily skilled in the art to which this present disclosure belongs. The system, methods, and examples provided herein are illustrative only and not intended to be limiting.

The present subject matter at least illustrates a composition for in-situ remediation of soil and aquifer, said composition consisting essentially of:
(a) a water miscible oil consisting of a vegetable oil and a surfactant;

(b) a solvent miscible with water and adapted to dissolve the vegetable oil to form a solution; and
(c) a catalyst selected from the group consisting of an enzyme defined by a biocatalyst, an alkaline compound, heat or combinations thereof.

In an embodiment, the composition provides a solvent present in an amount ranging from 10 to 60 wt % and a water miscible oil present in an amount ranging from 40 to 90 wt %. Organic solvents like hexane, alcohol, chloroform or petroleum ether are commonly used for dissolving oils or lipids. An alcohol is namely primary and secondary monohydric aliphatic alcohol comprising 1 to 8 carbon atoms (Ma et al; *Bioresour. Technol.*, 70 (1999), pp. 1-15). Alcohols such as ethanol and isopropanol are miscible with water. The solubility of soybean oil in ethanol at 40° C. is 20.4 wt. % and, in isopropanol at 20° C., 45.1 wt. %. The alcohol is thus a vegetable oil solvent that serves as a substrate shuttle for in-situ bioremediation. The solvent preferably used in the present subject matter is isopropanol ($CH_3CH_2CH_2OH$). The mixture of an alcohol with a water miscible oil (consisting of a vegetable oil and a surfactant) is more readily dispersible than EVO in aquifers and the subsurface by advection. An easy-to-distribute substrate means that an injection point can create greater radii of influence (ROI) which in turns reduces the required number of injection points to adequately supply a contaminated aquifer with electron donor. In other words, a larger volume of substrate can be dispersed from a single injection point.

For in-situ remediation, isopropanol thus provides the following benefits as a substrate shuttle for vegetable oil:
  At high concentrations, it aids in rehabilitation of injection wells and subsequent biofouling protection
  It is an excellent source of organic carbon and hydrogen (i.e., a good electron donor)
  At 20° C., it can dissolve about 45% vegetable oil.
  It aids in sequestering chlorinated solvents, temporarily reducing high (inhibitory to microbial degradation) groundwater solvent concentrations. Chawla et al., reported that a nontoxic co-solvent such as IPA can be used to solubilize trichloroethylene (TCE), removing a major barrier to in-situ biological degradation. After testing three co-solvents, namely isopropanol, ethanol and methanol alcohols, 50% isopropanol solution performed the best, solubilizing all of available TCE (9,900 ppm) (Chawla et al; *Effect of Alcohol Cosolvents on the Aqueous Solubility of Trichloroethylene, Proceedings of the* 2001 *Conference on Environmental Research*).
  It optimizes a long-lasting electron donor by liquefying vegetable oils into very small particles
  It allows a more efficient surfactant-use, effectively reducing emulsifier requirements.

In another embodiment, the composition comprises a water miscible oil consisting essentially of:
(a) 85 to 99 wt % of the vegetable oil, wherein the vegetable oil is selected from the group consisting of soybean oil, corn oil, coconut oil, rapeseed oil, canola oil, peanut oil, sunflower oil, olive oil, crambe oil, and mixtures thereof; and
(b) 1 to 15 wt % of the surfactant, or a co-surfactant or a polymer or a blend thereof,
wherein the surfactant is selected from the group consisting of non-ionic vegetable oil fatty acid esters, ethoxylated surfactants, oleate, and a mixture thereof,
wherein the co-surfactant is selected from the group consisting of polyglycerol oleic acid esters, fatty alcohol alkoxylates, and a mixture thereof,
wherein the polymer is selected from the group consisting of castor oil, ethylene glycol polymer and equivalents thereof; and
wherein a hydrophile-lipophile balance (HLB) value for a mixture of surfactant and co-surfactant ranges between 6-8.

Vegetable oils are triglycerides wherein a glycerin (or glycerol) molecule is connected via ester bonds to three fatty acid molecules. When the original ester (a chemical having the general structure R'COOR") is reacted with an alcohol, the process is called alcoholysis. Vegetable oils are hydrophobic and do not mix with water. Water miscible oils are thus better suited for aquifer remediation as they are easily distributed in the porous subsurface. These water miscible oils are prepared with the aid of polymers and surfactants that allow vegetable oils to spontaneously phase invert and disperse into a water continuum in the form of small droplets or micelles.

Figure 8:
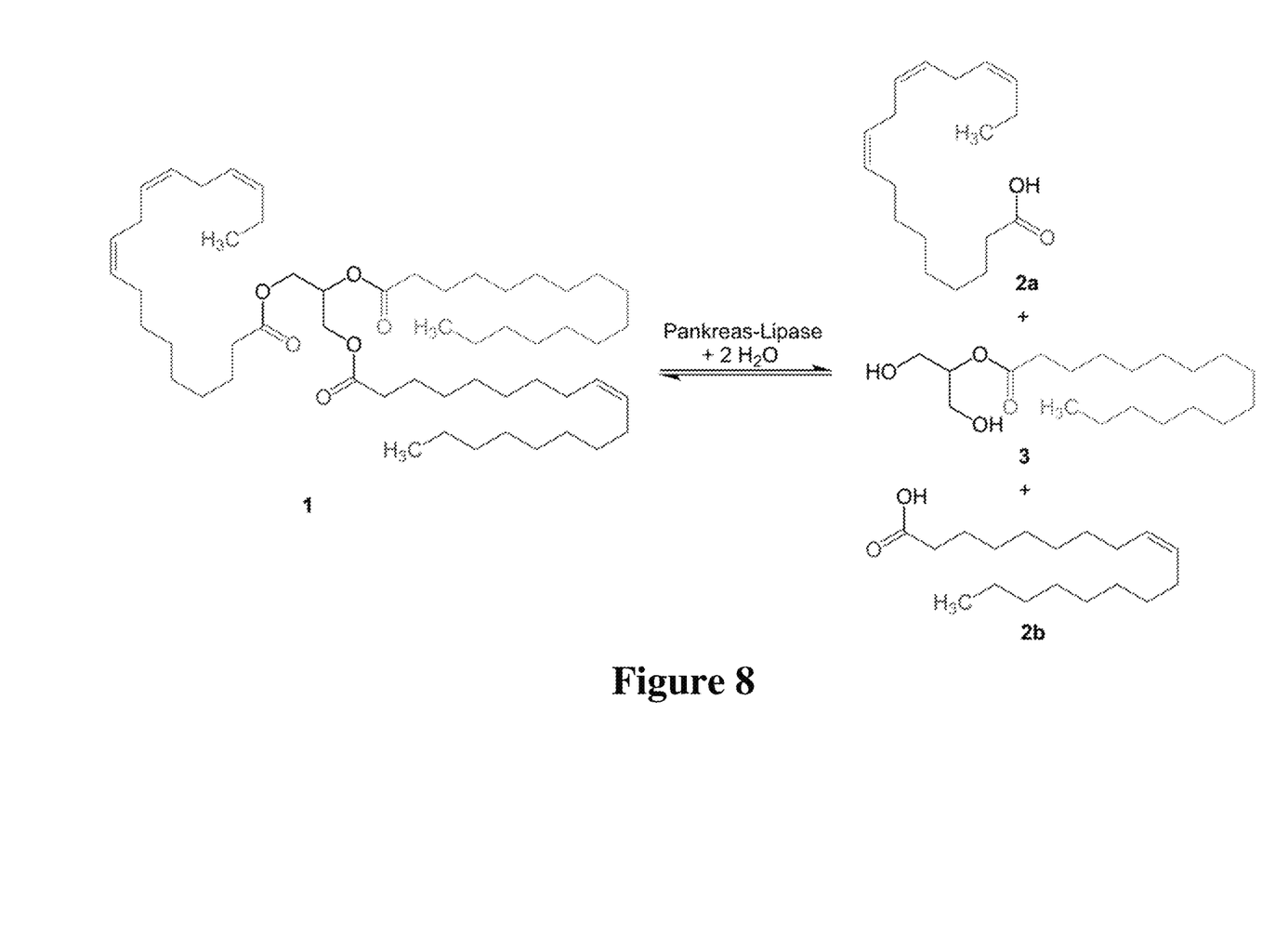
FIG. 8 illustrates hydrolysis of a triglyceride, wherein the pancreatic lipase cleaves triglycerides (1) only the $\alpha$-standing fatty acid residues to produce free fatty acids (2$a$) and (2$b$) and monoglyceride (3).

In another embodiment, the composition comprises enzymes as biocatalysts, wherein the enzyme is selected from triglyceride lipases that hydrolyze an ester linkage of a triglyceride. The optimized long-lasting donor (a water mixable oil and solvent mixture) can further undergo in-situ alcoholysis with the help of enzymes (biocatalysts), particularly lipases (FIG. 8). The Triglyceride lipases (EC 3.1.1.3) are a family of lipolytic enzymes distributed in animals, plants and prokaryotes (https://pfam.xfam.org/family/Lipase).

Figure 3:
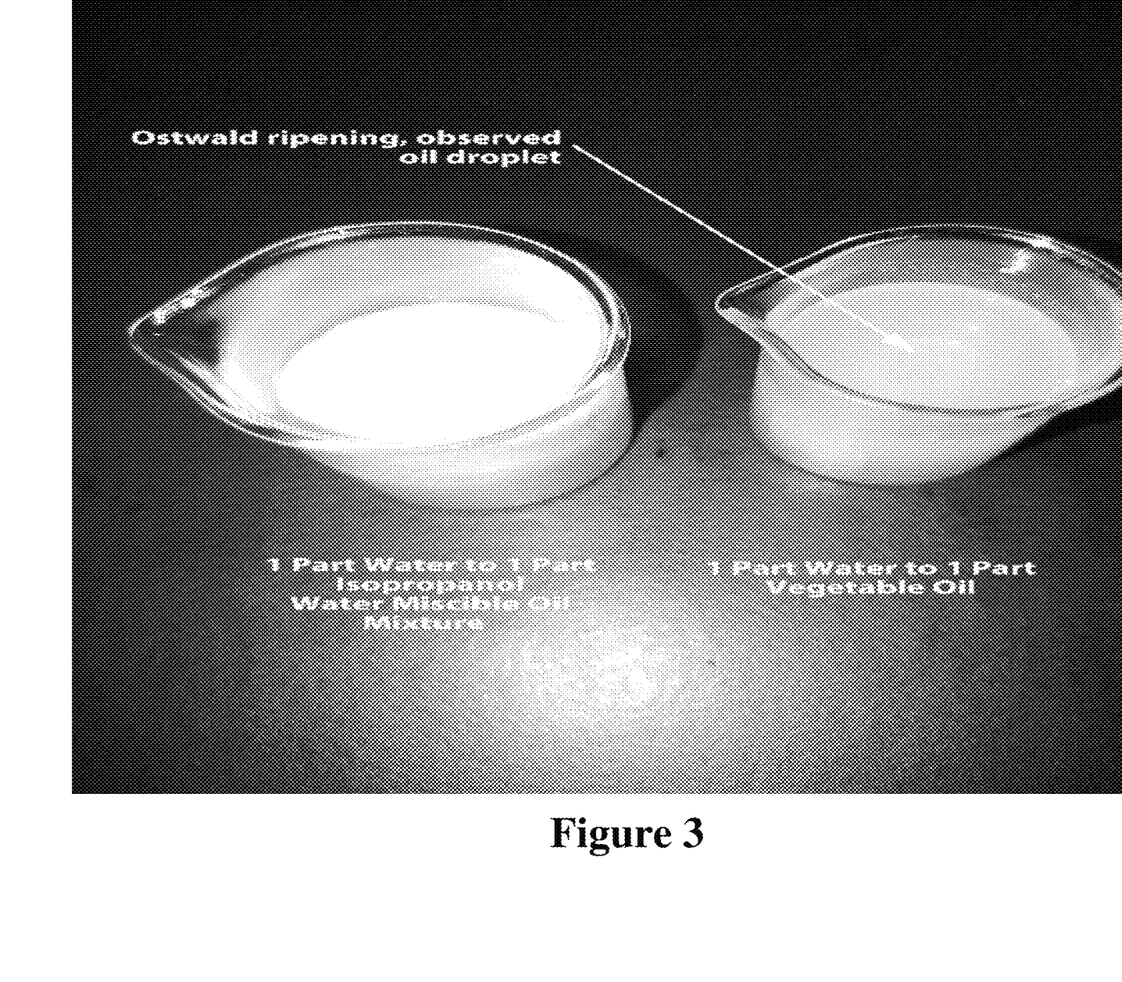
FIG. 3 illustrates emulsion comparison of isopropanol and vegetable oil to isopropanol and water miscible oil in accordance with an embodiment of the present subject matter.
Figure 4:
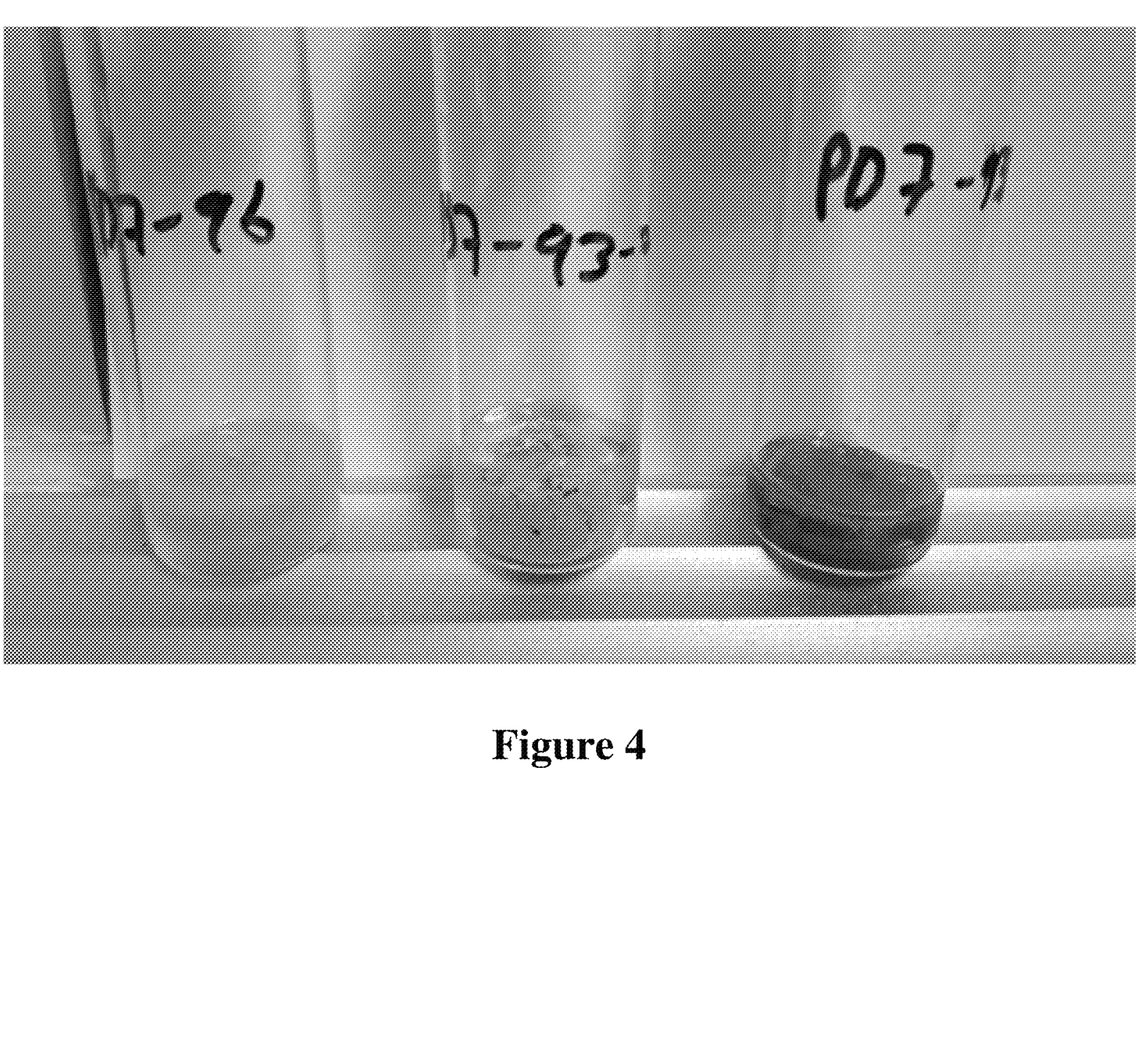
FIG. 4 illustrates soaking deposit material (i.e., crud) in water in accordance with an embodiment of the present subject matter.
Figure 5:
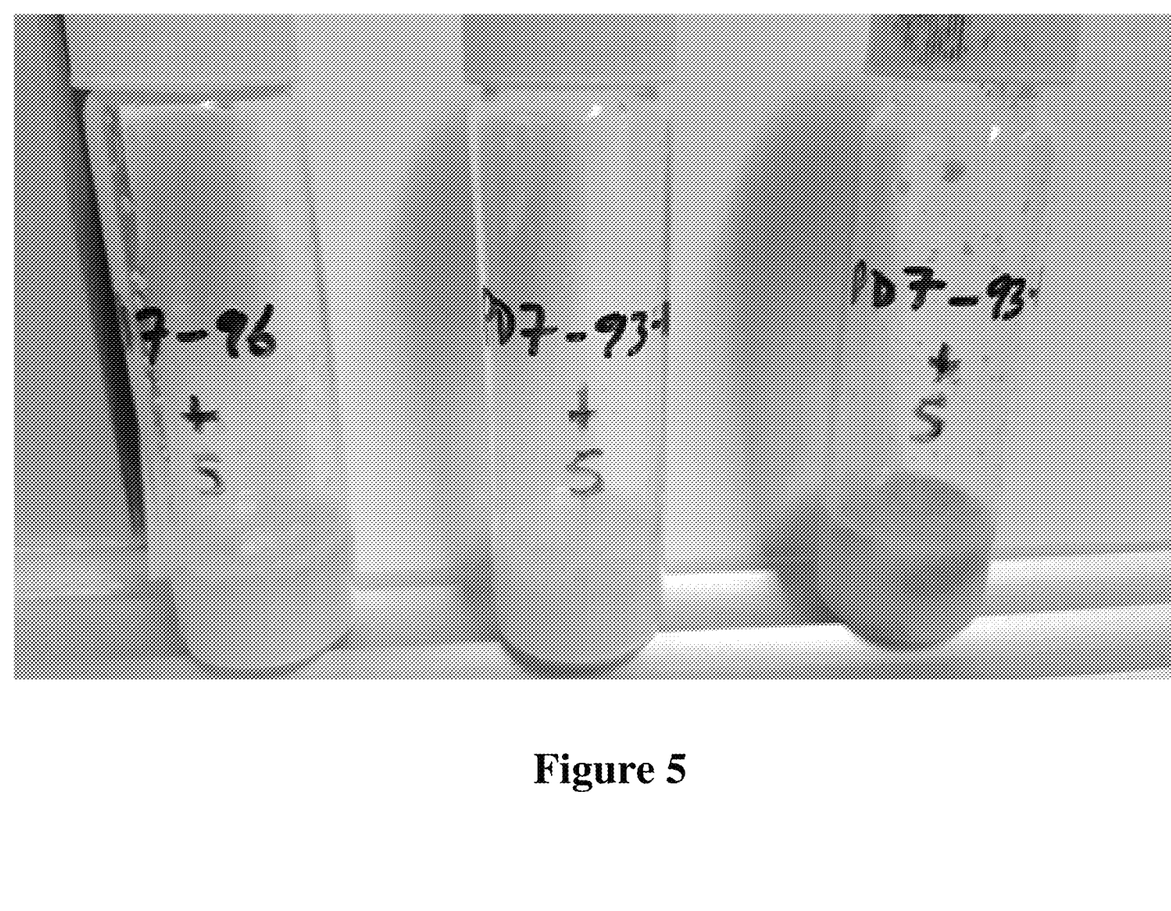
FIG. 5 illustrates soaking deposit material (i.e. crud) in a low dose surfactant mixture (1.8% TASK™ Surfactant) in accordance with an embodiment of the present subject matter.
Figure 6:
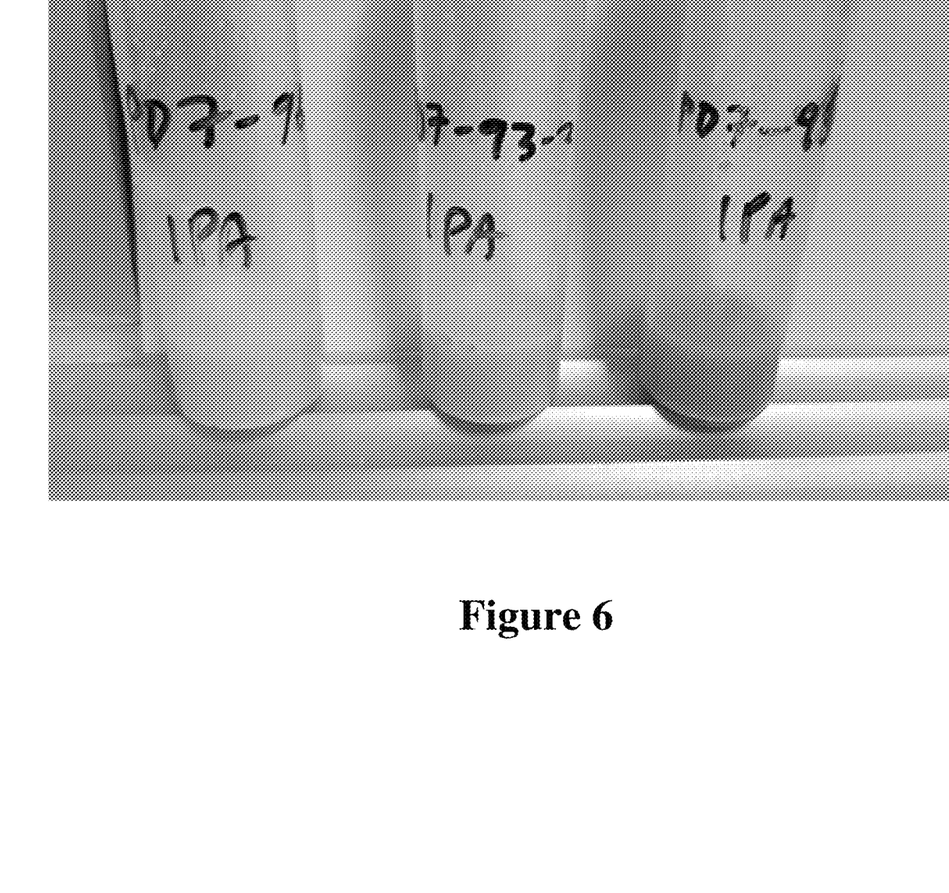
FIG. 6 illustrates soaking deposit material in 80% active isopropanol (IPA) in accordance with an embodiment of the present subject matter.
Figure 7:
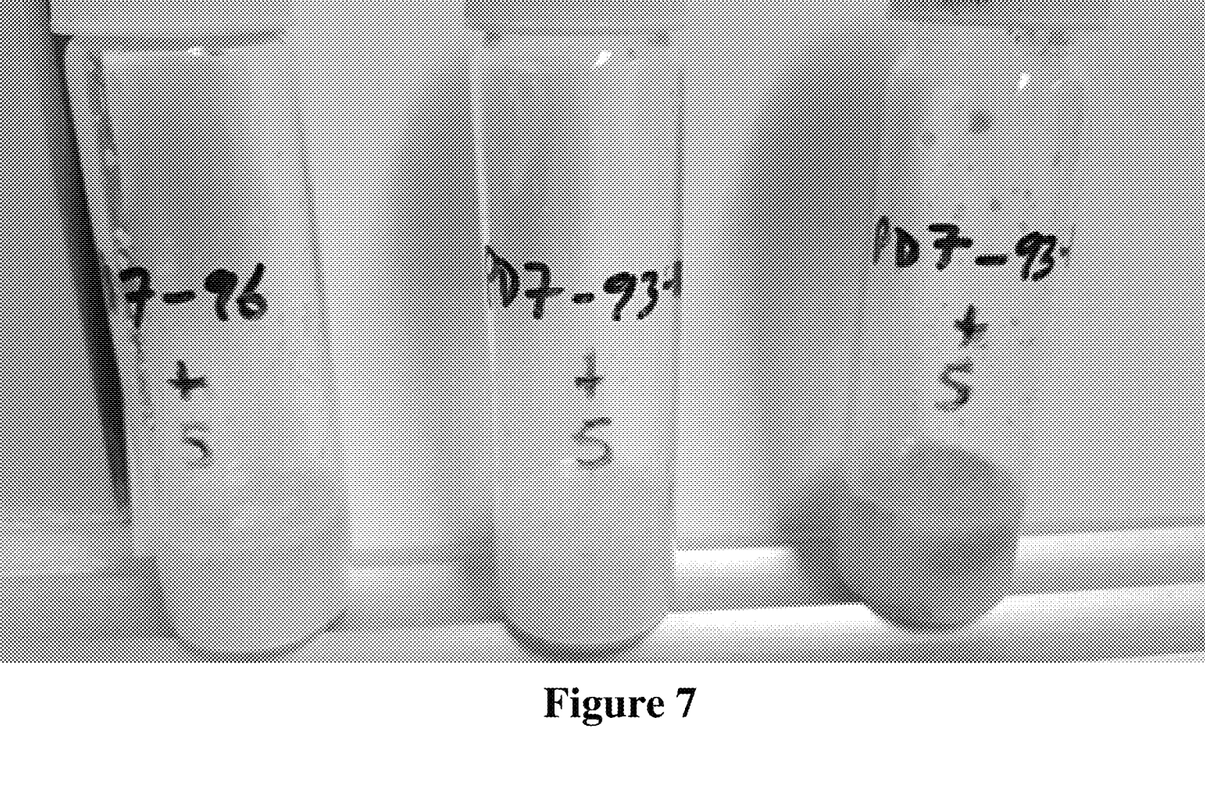
FIG. 7 illustrates soaking deposit material in 0.01 M NaOH (pH 14) in accordance with an embodiment of the present subject matter.

In another embodiment, the composition comprises alkaline compounds acting as a catalyst, wherein the alkaline compound is selected from potassium hydroxide or sodium hydroxide, wherein the alkaline compound is dissolved in an alcohol in an amount ranging from 0.1 to 5 wt % of the alkaline compound to the alcohol to form an alkyl oxide solution. In-situ alcoholysis is catalyzed with a homogeneous alkaline compound such as potassium hydroxide (KOH) or sodium hydroxide (NaOH) dissolved in a short-chain alcohol. Short-chain alcohols are selected from the group consisting of methanol, ethanol propanol, butanol, isopropanol, tert-butanol, branched alcohols and octanol and such selection is based on the cost of the alcohol and its reactivity (Yusuf et al. *Energy Convers. Manage.*, 52 (2011), pp. 2741-2751). While most of the alcohols is costly, isopropanol (also known as isopropyl alcohol, 2-propanol, rubbing alcohol, CAS Registry Number: 67-63-0) are least reactive alcohols due to steric hindrance. Accordingly, the preferred alcohols are ethanol and methanol. Methanol offers advantages over ethanol for the reaction and preparation of the alkaline catalyst stock solution as its reaction with triglycerides is quick and it is easily dissolved in KOH, the solubility of KOH in methanol is 55 g/100 g (28° C.). Potassium hydroxide is the preferred base for the process as it produces salts of carboxylic acids that are easily distributed in the subsurface. Sodium based alkaline compounds such as sodium hydroxide produces a hard soap that clogs the aquifer inhibiting distribution. When the triglyceride is reacted with an alcohol in the presence of a strong base, the fatty acids of the triglyceride molecule are cleaved and attach to the alkyl group of the alcohol to form fatty acid alkyl esters, carboxylic acids/salts and glycerol as shown in FIG. 3.

In yet another embodiment, the composition refers to heat as a catalyst wherein in the heat is from steam hydrolysis, electrical resistance heating, thermal conduction heating, gas thermal heating or residual heat from an in-situ thermal remediation project.

In another embodiment, the present subject matter provides a process of preparation of the disclosed composition for in-situ soil and aquifer remediation, the process comprising:

(a) mixing 85 to 99 wt % of a vegetable-oil with 1 to 15 wt % a surfactant, or a co-surfactant or a polymer or a blend thereof to obtain a water miscible oil, (b) mixing 40 to 90 wt % of the water-miscible oil obtained in step (a) to the 10 to 60 wt % of a solvent to obtain a mixture, and (c) combining catalyst with the mixture obtained in step (b) to obtain the composition for in-situ use.

In an embodiment, the composition is used for removal of contaminants defined by at-least one of:

recalcitrant organic and inorganic contaminants selected from the group consisting of halogenated straight-chain and aromatic hydrocarbons; perchlorate derivatives;

explosives selected from the group consisting of nitroaromatic compound, nitramine compounds, nitrate esters, and energetic munitions residuals; nitrates; and oxidized metals; and a combination thereof.

A further feature of the present subject matter provides a nonaqueous admixture for in-situ remediation of recalcitrant organic and inorganic contaminants in surface and an aquifer consisting essentially of:

10 to 60% water miscible oil, and 40 to 90% solvent; wherein the solvent is selected from methanol, ethanol and isopropanol.

More preferably, the water miscible oil is present in an amount ranging from 40% to 90% by weight in isopropanol to constitute the nonaqueous admixture. In a further embodiment, the nonaqueous admixture comprises a water miscible oil consisting essentially of:

(a) 85 to 99 wt % vegetable oil; and (b) 1 to 15 wt % of a blend of a surfactant, a co-surfactant and/or a polymer, wherein the HLB value of the blend ranges from 6 to 8.

Another feature of the present subject matter relates to a method for in-situ remediation of recalcitrant organic and inorganic contaminants in soil and an aquifer, using the disclosed composition the method comprising:

(a) mixing a solvent and a water miscible oil to obtain a mixture, wherein the water miscible oil consists of a vegetable oil, and a surfactant or a co-surfactant or a polymer or a blend thereof;

(b) combining a catalyst with the mixture obtained in step (a) to obtain a composition for in-situ use, wherein the catalyst is selected from the group consisting of an enzyme defined at least by a biocatalyst, an alkaline compound, heat or combinations thereof; and (c) introducing the composition obtained in step (b) into the soil or aquifer.

In an embodiment, step (c) of said method further includes a step of introducing the composition obtained in step (b) into the soil or aquifer via gravity feeding, induced gas stream, a pump, at least one push rod, at least one injection point, an injection through a well, a French drain type system, deep tilling, an hydraulic injection, a multiphase inert gas injection, an aerosol injection, a water injection, at least one pump, at least one blower, at least one compressor, tank, at least one tank of compressed gas, at least one compressed gas tank after a blower or compressor, a direct push rig, at least one hand-held injection rod, or a combination thereof. Preferably, step (c) of the above method is performed at a pressure between ranging between 10 psi and 1000 psi.

In yet another embodiment, the above method further includes a step by adding the mixture and the catalyst into a targeted area via mechanical mixing of soils. More preferably, the above method relates to a step by adding the mixture and the catalyst at an open excavation or trench prior to backfilling.

In a further embodiment, the remediation process using the above disclosed composition further comprises additional materials for promoting an environment for enhanced anaerobic bioremediation, said additional-materials comprising at least one of a zero-valent metal, iron sulfide reagents, vitamins, a yeast-extract, biological cultures and mixtures thereof.

Contaminants in a non-aqueous phase partition or solubilize into the above disclosed composition upon contact which aids in creating favorable conditions for bioremediation as contaminant dissolved phase concentrations decrease from otherwise inhibitory levels. The uniqueness of the composition for in-situ remediation allows ease of subsurface distribution with minimum aquifer permeability, losses and biofouling typically associated with the injection of EVO and other long-lasting electron donors. Another remediation benefit of this subject matter is the pH buffering capacity preventing the creation of acidic conditions that inhibit biodegradation of contaminants. The composition neutralizes aquifer acidity, fatty acids generated during fermentation, and acid generated from reductive dichlorination thus enabling maximum biodegradation rates. The method of remediation involves mixing an engineered water-soluble oil or water miscible oil with a solvent and adding a catalyst to groundwater to promote the formation of fatty acid alkyl esters, carboxylic acid salts and glycerol. Thereupon, the microorganisms in groundwater use the formed products as electron donors during reductive biological processes that turn contaminants into innocuous derivatives. Illustratively, the self-emulsifying oils are natural seed oils (vegetable oils) mixed with surfactants and polymers. Fermentation reactions thus take place on excess organic material, generating in turn hydrogen that allows anaerobic biological processes that reduce oxidized contaminants such as halogenated compounds to innocuous end products. The reaction produces long-lasting electron donors, fatty acid esters, and water-soluble electron donors, carboxylic acids and glycerol that are easy to distribute in the subsurface by advection. The properties allow increasing the ROI and reducing the required number of injection points as larger volumes of substrate could be dispersed from a single injection point by using the present composition. Having described the basic aspects of the present subject matter, the following non-limiting examples illustrate specific embodiments and example evaluation-results of the present subject matter.

In an example, a series of tests showed that isopropanol can serve to increase an aquifer's permeability previously reduced by biofouling or the formation of crud after EVO injections. Experiments with crud samples from fouled injection wells included exposing them to surfactants, isopropanol or to high pH at room temperature. FIG. 2 shows the received crud samples. FIGS. 4 through 7 show various treatment methods. As evidenced by the experiment, isopropanol dissolved the deposit material that created permeability losses and damaged the injection wells.

In an example, an evaluation was performed comparing mixtures of isopropanol and vegetable oil to isopropanol and water miscible oil at ratios of 3:2. The addition of the isopropanol lowered the viscosity of both mixtures and the mixtures seemed Newtonian in character (i.e., shear stress from mild mixing did not appear to reduce the viscosity of the mixture). Water was next added at 1:1 ratio to simulate dilution prior to a subsurface injection event. In the vegetable oil-alcohol emulsion, alcohol is the polar phase and vegetable oil is the nonpolar phase. These types of emulsions enable the incorporation of water- and insoluble oil into the emulsion. The isopropanol/vegetable oil mixture spontaneously formed a white cloudy emulsion. In a short period of time, the sample exhibited Ostwald ripening as observed in FIG. 3 which shows oil droplets creaming out and floating to the top of the sample. Over the course of the day, the oil layer increased in size. The isopropanol/water miscible oil sample spontaneously emulsified and exhibited pseudoplastic behavior. In other words, the apparent viscosity decreased after adding shear stress from mild mixing with a glass stir bar. The addition of polymers and surfactants thus improved product handling for in-situ remediation processes and effective subsurface distribution.

In an example, potassium hydroxide (a strong base) serving as a homogeneous alkaline compound, was dissolved separately in methanol and ethanol to prepare a catalyst stock solution of 0.1 to 5% by weight alkaline compound to alcohol as shown below. The effective species of catalysis was the methoxide radicals ($CH_3O^-$) or the ethoxide radicals ($CH_3CH_2O^-$).

Potassium Methoxide (Potassium Methylate)

Potassium Ethoxide (Potassium Ethanolate)

Figure 9:
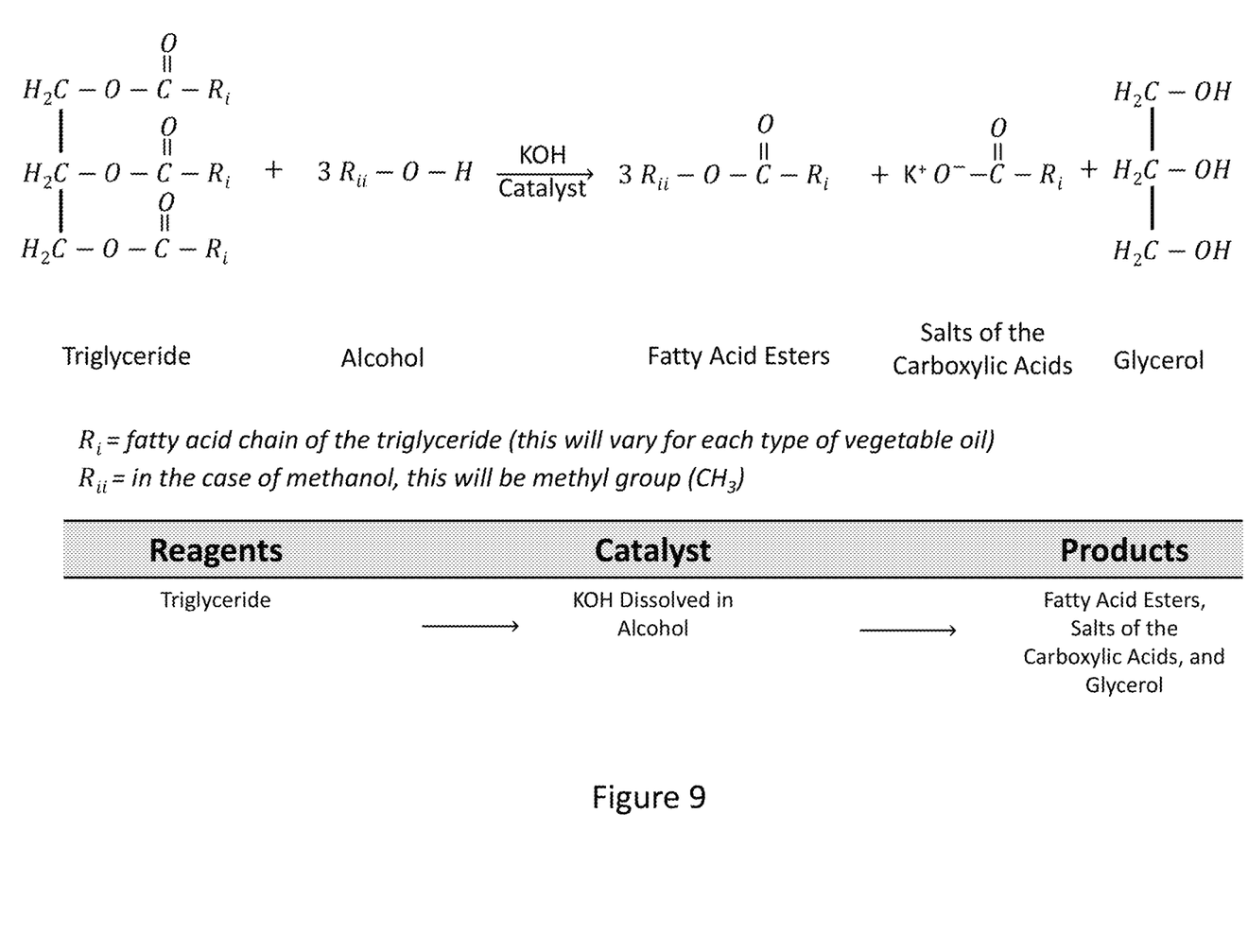
FIG. 9 illustrates transesterification of vegetable oils, reaction of triglyceride with an alcohol in the presence of a strong base, KOH in accordance with an embodiment of the present subject matter.

As shown in FIG. 9, the stoichiometric ratio requires 3 moles of alcohol per mole of triglyceride which would be about 10% by volume for methanol. Thus, double or triple the stoichiometric ratio, i.e., 6:1 to 9:1 moles of alcohol to triglyceride, was used to shift the equilibrium constant and favor the forward reaction to obtain more amount of product. Excess alcohols further serves as soluble electron donors to aid in anaerobic reductive bioremediation. Alkyl oxide solutions of potassium methoxide ($KOCH_3$) in methanol, (CAS Number 865-33-8 in 67-56-1), or potassium ethoxide ($KOCH_2CH_3$) in ethanol, (CAS Number 865-33-8 in 64-17-5), were used as preferred catalysts.

In an example, the in-situ alcoholysis reaction was also catalyzed with the aid of heat. In-situ heating techniques included steam treatment, electrical resistance heating, thermal conduction heating, geothermal pumping, gas thermal heating or residual heat from an in-situ thermal or in-situ chemical oxidation (ISCO) remediation project. Reaction temperature was controlled to determine the rate and yield of the alcoholysis reaction. Also, the temperature of the reaction was below the boiling-point of the alcohol and was used to prevent the evaporation of the alcohol (Abbah et al; *American Journal of Energy Science (AJER)*. 3 (2016), pp. 16-20). Istiningrum et al. 2017 found that the optimal temperature was 55° C. (see FIG. 10) (*AIP Conference Proceedings* 1911, 020031 (2017); https://doi.org/10.1063/1.5016024). The hydrolysis yields carboxylic acid (rather than its salt) and glycerol. Potassium hydroxide is subsequently injected to neutralize the acid.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

To the extent that method or apparatus embodiments herein are described as having certain numbers of elements, it should be understood that fewer than all of the elements may be necessary to define a complete claim. In addition, sequences of operations or functions described in various embodiments do not require or imply a requirement for such sequences in practicing any of the appended claims. Operations or functions may be performed in any sequence to effectuate the goals of the disclosed embodiments.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the forthcoming claims.

The invention claimed is:

1. A composition for in-situ remediation of soil or aquifer, said composition consisting essentially of:
   (a) a water miscible oil consisting of a vegetable oil and a surfactant;
   (b) a solvent miscible with water and adapted to dissolve the vegetable oil to form a solution; and
   (c) a catalyst selected from the group consisting of an enzyme defined by a biocatalyst, an alkaline compound, or combinations thereof, wherein the alkaline compound is selected from potassium-hydroxide or sodium hydroxide, and wherein the alkaline compound is dissolved in an alcohol in an amount ranging from 0.1 to 5 wt. % of the alkaline compound to form an alkyl oxide solution.

2. The composition as claimed in claim 1, wherein the composition is used for removal of contaminants defined by at-least one of:
   recalcitrant organic contaminants selected from the group consisting of halogenated straight-chain and aromatic hydrocarbons; and inorganic contaminants selected from perchlorate derivatives, nitrates; and oxidized metals;
   explosive contaminant selected from the group consisting of nitroaromatic compound, nitramine compounds, nitrate esters, and energetic munitions residuals; and a combination thereof.

3. The composition as claimed in claim 1, wherein said solvent is present in an amount ranging from 10 to 60 wt. % and the water miscible oil is present in an amount ranging from 40 to 90 wt. %.

4. The composition as claimed in claim 1, wherein said solvent is isopropanol.

5. The composition as claimed in claim 1, wherein said water miscible oil consisting essentially of:
   (a) 85 to 99 wt. % of the vegetable oil, wherein the vegetable oil is selected from the group consisting of soybean oil, corn oil, coconut oil, rapeseed oil, canola oil, peanut oil, sunflower oil, olive oil, crambe oil, and mixtures thereof; and
   (b) 1 to 15 wt. % of a surfactant, a co-surfactant, a polymer, or a blend thereof, wherein the surfactant is selected from the group consisting of non-ionic vegetable oil fatty acid esters, ethoxylated surfactants, oleate, and a mixture thereof, wherein the co-surfactant is selected from the group consisting of polyglycerol oleic acid esters, fatty alcohol alkoxylates, and a mixture thereof,
   wherein the polymer is selected from the group consisting of castor oil, ethylene glycol polymer and equivalents thereof; and
   wherein a hydrophile-lipophile balance (HLB) value for a mixture of surfactant and co-surfactant ranges between 6-8.

6. The composition as claimed in claim 1, wherein the enzyme is selected from triglyceride lipases that hydrolyze an ester linkage of a triglyceride.

7. The composition as claimed in claim 1, wherein the alcohol is selected from ethanol and methanol.

8. A process of preparation of the composition as claimed in claim 1 for in-situ soil or aquifer-remediation, the process comprising:
   (a) mixing 85 to 99 wt. % of a vegetable-oil with 1 to 15 wt. % a surfactant, a co-surfactant, a polymer, or a blend thereof to obtain a water miscible oil;
   (b) mixing 40 to 90 wt. % of the water-miscible oil obtained in step (a) to the 10 to 60 wt. % of a solvent to obtain a mixture, and
   (c) combining a catalyst with the mixture obtained in step (b), or heating the mixture obtained in step (b) to obtain the composition for in-situ use, wherein the catalyst is selected from the group consisting of an enzyme defined by a biocatalyst, an alkaline compound, or combinations thereof, wherein the alkaline compound is selected from potassium-hydroxide or sodium hydroxide, wherein the alkaline compound is dissolved in an alcohol in an amount ranging from 0.1 to 5 wt. % of the alkaline compound to form an alkyl oxide solution.

9. The process as claimed in claim 8, wherein heating the mixture obtained in step (b) comprises heating by steam hydrolysis, electrical resistance heating, thermal conduction heating, gas thermal heating or residual heat from an in-situ thermal remediation project.

10. A process of preparation of the composition as claimed in claim 3 for in-situ soil or aquifer-remediation, the process comprising:
    (a) mixing 85 to 99 wt. % of a vegetable-oil with 1 to 15 wt. % of a surfactant, a co-surfactant, a polymer, or a blend thereof to obtain a water miscible oil;
    (b) mixing 40 to 90 wt. % of the water-miscible oil obtained in step (a) to the 10 to 60 wt. % of a solvent to obtain a mixture, and
    (c) combining a catalyst with the mixture obtained in step (b), or heating the mixture obtained in step (b) to obtain the composition for in-situ use wherein the catalyst is selected from the group consisting of an enzyme defined by a biocatalyst, an alkaline compound, or combinations thereof, wherein the alkaline compound is selected from potassium-hydroxide or sodium hydroxide, wherein the alkaline compound is dissolved in an alcohol in an amount ranging from 0.1 to 5 wt. % of the alkaline compound to form an alkyl oxide solution.

11. The process as claimed in claim 10, wherein heating the mixture obtained in step (b) comprises heating by steam hydrolysis, electrical resistance heating, thermal conduction heating, gas thermal heating or residual heat from an in-situ thermal remediation project.

12. A non-aqueous admixture for in-situ remediation of recalcitrant organic and inorganic contaminants in surface and an aquifer consisting essentially of:
    10 to 60 wt. % water miscible oil;
    40 to 90 wt. % solvent; wherein the solvent is selected from methanol, ethanol and isopropanol; and a catalyst selected from the group consisting of an enzyme defined by a biocatalyst, an alkaline compound, or combinations thereof, wherein the alkaline compound is selected from potassium-hydroxide or sodium hydroxide, wherein the alkaline compound is dissolved in an alcohol in an amount ranging from 0.1 to 5 wt. % of the alkaline compound to form an alkyl oxide solution, and wherein the recalcitrant organic contaminants are selected from the group consisting of halogenated straight-chain and aromatic hydrocarbons; and inorganic contaminants are selected from perchlorate derivatives, nitrates; and oxidized metals.

13. The nonaqueous-admixture as claimed in claim 12, wherein said water miscible oil consists essentially of:
   (a) 85 to 99 wt. % vegetable oil; and
   (b) 1 to 15 wt. % of a blend of a surfactant, a co-surfactant and/or a polymer, wherein the HLB value of the blend ranges from 6 to 8.

14. The nonaqueous-admixture as claimed in claim 12, wherein said water miscible oil is present in an amount ranging from 40% to 90% by weight in isopropanol.

15. A method for in-situ remediation of recalcitrant organic and inorganic contaminants in soil or an aquifer, the method comprising:
   (a) mixing a solvent and a water miscible oil to obtain a mixture, wherein the water miscible oil consists of a vegetable oil, and a surfactant or a co-surfactant or a polymer or a blend thereof;
   (b) combining a catalyst with the mixture obtained in step (a) to obtain a composition for in-situ use, wherein the catalyst is selected from the group consisting of an enzyme defined at least by a biocatalyst, an alkaline compound, heat or combinations thereof; and
   (c) introducing the composition obtained in step (b) into the soil or aquifer,
      wherein the composition obtained in step (b) consists essentially of:
         the water miscible oil consisting of the vegetable oil and the surfactant;
         the solvent miscible with water and adapted to dissolve the vegetable oil to form the solution; and
         the catalyst selected from the group consisting of the enzyme defined by the biocatalyst, the alkaline compound, or combinations thereof, wherein the alkaline compound is selected from potassium-hydroxide or sodium hydroxide, and wherein the alkaline compound is dissolved in an alcohol in an amount ranging from 0.1 to 5 wt. % of the alkaline compound to form an alkyl oxide solution.

16. The method of claim 15, wherein step (c) of said method further includes a step of introducing the composition obtained in step (b) into the soil or aquifer via gravity feeding, induced gas stream, a pump, at least one push rod, at least one injection point, an injection through a well, a French drain type system, deep tilling, an hydraulic injection, a multi-phase inert gas injection, an aerosol injection, a water injection, at least one pump, at least one blower, at least one compressor, tank, at least one tank of compressed gas, at least one compressed gas tank after a blower or compressor, a direct push rig, at least one hand-held injection rod, or a combination thereof.

17. The method as claimed in claim 15, wherein step (c) is performed at a pressure between ranging between 10 psi and 1000 psi.

18. The method as claimed in claim 15, wherein said method further comprises: adding the mixture and the catalyst into a targeted area via mechanical mixing of soils.

19. The method as claimed in claim 15, wherein said method further comprises a step of adding mixture and catalyst at an open excavation or trench prior to backfilling.

20. The method as claimed in claim 15, further comprising:
   adding additional materials for promoting an environment for enhanced anaerobic bioremediation, said additional-materials comprising at least one of a zero-valent metal, iron sulfide reagents, vitamins, a yeast-extract, biological cultures and mixtures thereof.

* * * * *